May 25, 1926.

H. I. WILLIS

AUTO TIRE CHAIN LOCK

Filed Feb. 8, 1926

1,585,955

H. I. Willis, Inventor

Patented May 25, 1926.

1,585,955

UNITED STATES PATENT OFFICE.

HENRY I. WILLIS, OF COLFAX, WASHINGTON, ASSIGNOR OF ONE-THIRD TO FLOYD R. BURCH, OF COLFAX, WASHINGTON.

AUTO TIRE CHAIN LOCK.

Application filed February 8, 1926. Serial No. 86,852.

This invention relates to a fastening device to be employed in connection with antiskid chains for motor vehicles, the primary object of the invention being to provide a fastening device of this character including a main or body portion and a pivoted lever, novel means being provided for locking the lever in its active position.

A further object of the invention is to provide a device of this character wherein the usual close fitting guards employed as a part of the usual chain fastening device is eliminated.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
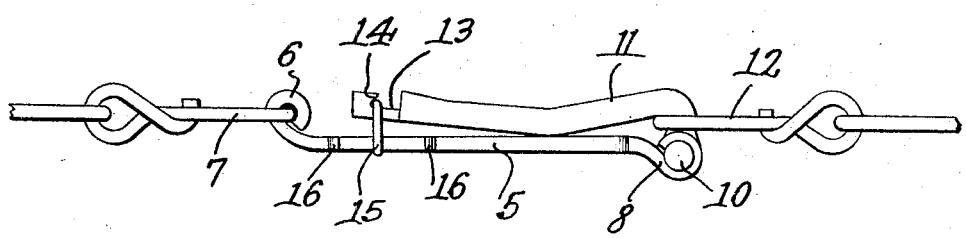
Figure 1 is a side elevational view of a fastening device constructed in accordance with the invention.
Figure 2:
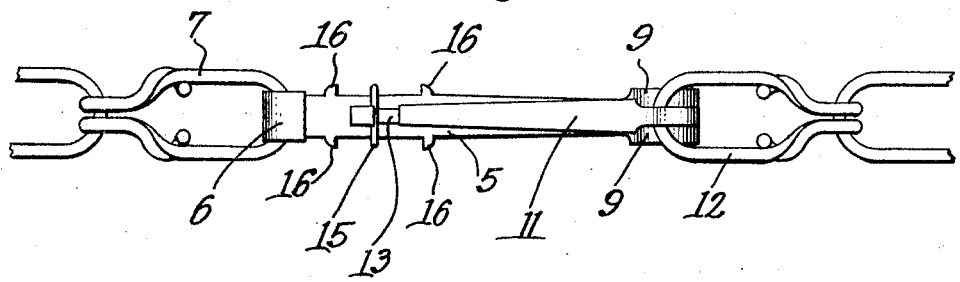
Figure 2 is a plan view thereof.

Referring to the drawing in detail, the device includes a body portion 5 which is formed preferably of a length of spring metal having one end thereof turned upwardly to provide an eye 6 through which one end link of the chain, which is indicated at 7, may be passed, to secure the body portion to the chain.

The opposite end of the body portion 5 extends slightly downwardly as indicated at 8 and as shown, this end portion is formed with a central cut out portion defining lateral bearings 9, the end portion being curved upwardly as illustrated by Figure 1.

The reference character 10 indicates a pivot pin which is formed at one end of the lever 11, the ends of the pin 10 extending laterally where they are positioned within the bearings to pivotally connect the lever to the body portion 5. This lever 11 extends upwardly at a point adjacent to the pivot pin 10, the inner edge thereof being curved to accommodate the end link 12.

The lever 11 is bent in such a way that the central portion thereof will contact with the body portion 5, leaving the free end of the lever in spaced relation with the body portion 5 and due to the fact that the lever 11 is constructed of spring steel, it will be obvious that the outer end of the lever may be bent downwardly for purposes to be hereinafter more fully described.

Formed in the upper surface of the lever 11 at a point adjacent to the free end thereof, is a cut out portion 13, the forward wall thereof being disposed at an angle as shown at 14, so that the locking link which is indicated at 15 and which is movably supported on the body portion 5, will be locked thereunder, in such a way as to prevent the lever from moving to its open position.

Laterally extended lugs 16 are formed on the edges of the body portion 5 and are arranged in spaced relation with each other, the lugs acting as stops for the link 15 to prevent the same from becoming disconnected from the body portion.

In the use of the device, the lever 11 is forced downwardly at its outer end, thereby permitting the locking link 15 to be moved from its position within the cut out portion 13, whereupon the lever 11 may be swung upwardly and the link 12 positioned thereover.

The lever 11 may now be moved downwardly to a position as shown by Figure 1 and the outer end of the lever be depressed to allow the locking link 15 to be positioned within the cut out portion 13, to lock the lever against movement.

Due to the flexibility of the lever 11, it will be obvious that the link 15 will be held tight at all times.

I claim:—

A fastening device of the class described comprising a body portion, said body portion having an eye formed at one end thereof and having a bearing opening formed at the other end thereof, a lever having a pivot pin adapted to be positioned in the bearing opening, said lever being curved intermediate its ends, the curved portion of the lever adapted to normally contact with the body portion, said lever having a cut out portion adjacent to one end thereof and providing a keeper, said lever adapted to engage a link of a chain, and a link carried by the body portion and adapted to be positioned in the cut out portion of the lever to lock the lever against movement.

In testimony that I claim the foregoing as my own, I have hereto affixed my signature.

HENRY I. WILLIS.